JOHN GRANT, OF OMAHA, NEBRASKA.

ARTIFICIAL STONE.

SPECIFICATION forming part of Letters Patent No. 338,060, dated March 16, 1886.

Application filed December 29, 1885. Serial No. 187,002. (No specimens.)

*To all whom it may concern:*

Be it known that I, JOHN GRANT, a citizen of the United States, residing at Omaha, in the county of Douglas and State of Nebraska, have invented certain new and useful Improvements in Artificial Stone; and I do declare the following to be a full, clear, and exact description of the invention, such as will enable others skilled in the art to which it appertains to make and use the same.

This invention relates to certain improvements in artificial stone for pavements and other like purposes; and it has for its objects to produce a compound that may be readily laid while in a plastic state, and which when hardened and thoroughly indurated will not disintegrate or fall to pieces, which will take a high polish, if so desired, and have a good color.

My invention consists in a compound composed of the slag formed during the reduction of gold, silver, and lead ores and hydraulic cement mixed to the proper consistence with water. The slag employed in the present instance, besides the silica, alumina, and the other substances found in ordinary furnace-slag, contains a percentage of lead in the form of an oxide, which unites with the lime and alkaline salts in the hydraulic cement, and by neutralizing said salts removes the tendency to disintegrate common to the concrete compounds generally in use for artificial pavements containing ordinary slag, the lime of which slowly slakes, producing such disintegration. The lead contained in the slag also serves to give a fine color to the compound, which can be varied by using the powder of the slag as an addition to the compound, when desired.

In carrying my invention into effect the slag is crushed, rolled, and screened until free from dust, the fragments varying from the size of a buckshot to one-half an inch. It is then mixed with hydraulic cement, which may be Roman cement or any compound having the desired hydraulic properties.

The proportions of the different ingredients may be varied considerably without altering the character of my invention according to the nature of the work required. I have found the following to answer well for general purposes, however, viz: slag, two parts; hydraulic cement, one part. Sand or gravel not to exceed one-sixth the amount of the slag mixture may be contained in the compound. The materials are mixed and stirred so as to form a homogeneous plastic compound, which can be conveniently spread for the purpose of laying. As a general thing, the compound is employed for surfacing, and is laid upon a base or substructure of coarser material; but it is evident that it may be employed to form the whole body of the pavement without departing from the spirit of my invention.

The compound may be worked and laid in any improved manner of laying concrete pavements, and its surface may be roughened, scored, or ornamented in any desired manner.

The sand or gravel may be employed, if desirable, but the gist of the invention consists in a compound composed of the slag of gold and silver bearing ores containing lead, as above stated.

I am aware that ordinary furnace slag has been heretofore used in connection with hydraulic cement in the manufacture of artificial stone for various purposes, and to such compound I make no claim.

What I do claim, and desire to secure by Letters Patent, is—

1. The herein-described compound for artificial pavements and other similar purposes, consisting of the slag formed during the reduction of gold and silver bearing ores combined with hydraulic cement, substantially as specified.

2. The herein-described compound for artificial pavements, composed of slag from the reduction of gold and silver bearing ores, hydraulic cement, sand or gravel, and water combined, substantially as specified.

3. An artificial-stone pavement composed of the slag of gold and silver bearing ores after reduction and hydraulic cement, substantially as described.

4. An artificial-stone pavement composed of the slag of gold and silver bearing ores combined with hydraulic cement and applied to a base or substructure of ordinary concrete, substantially as specified.

5. An artificial-stone pavement composed of the slag of gold and silver bearing ores with hydraulic cement and sand or gravel mixed with water and laid in a plastic state, substantially as described.

6. An artificial-stone pavement composed of slag from gold and silver bearing ores, combined with hydraulic cement and gravel, and a base or substructure of ordinary concrete, the compound being applied as a surface, substantially as specified.

In testimony whereof I affix my signature in presence of two witnesses.

JOHN GRANT.

Witnesses:
IRA R. STEWARD,
WM. F. HUNTEMANN.